Dec. 22, 1925. 1,566,726
D. H. BRADLEY
MOTOR VEHICLE
Filed Dec. 28, 1921 2 Sheets-Sheet 2
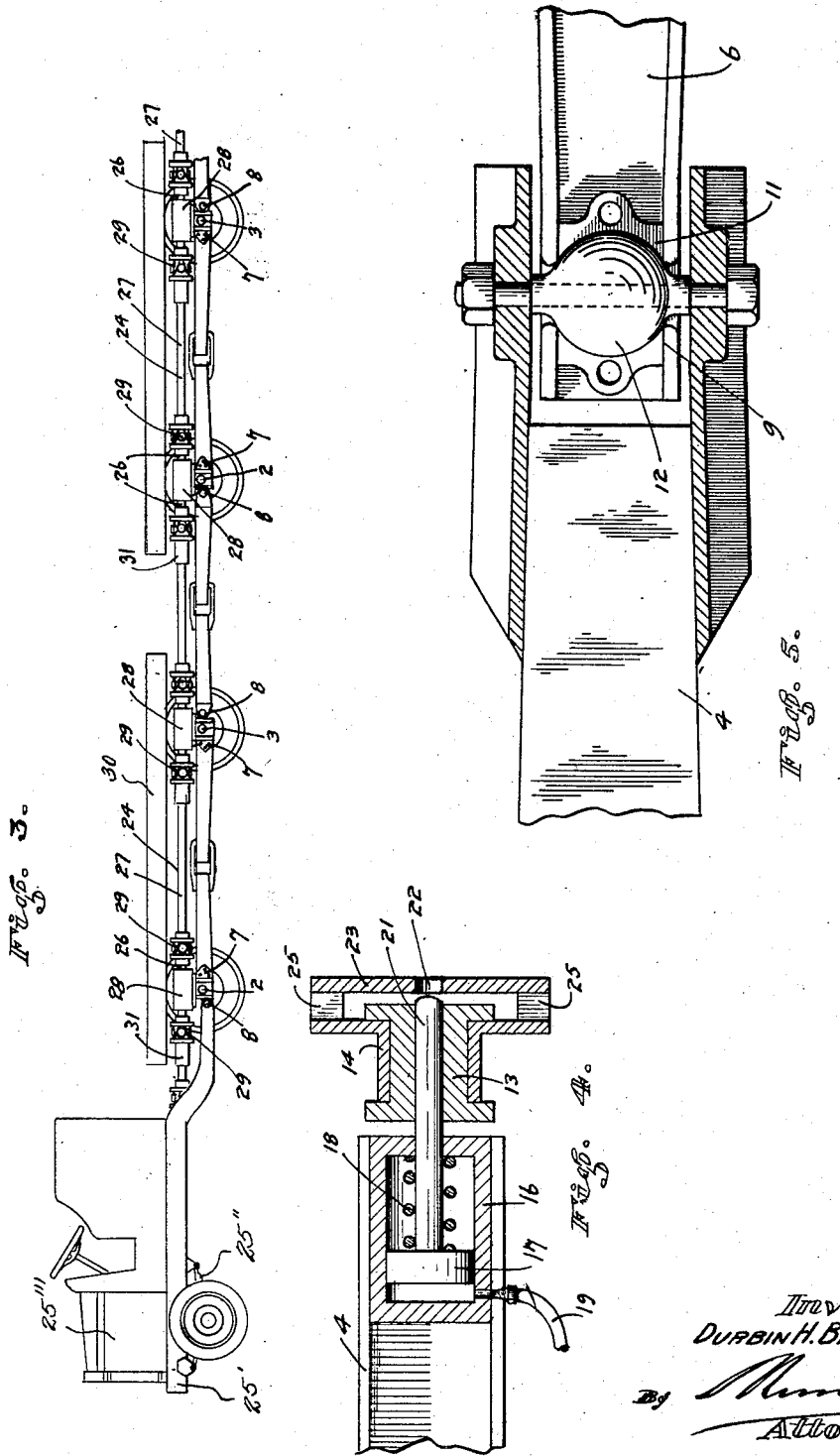

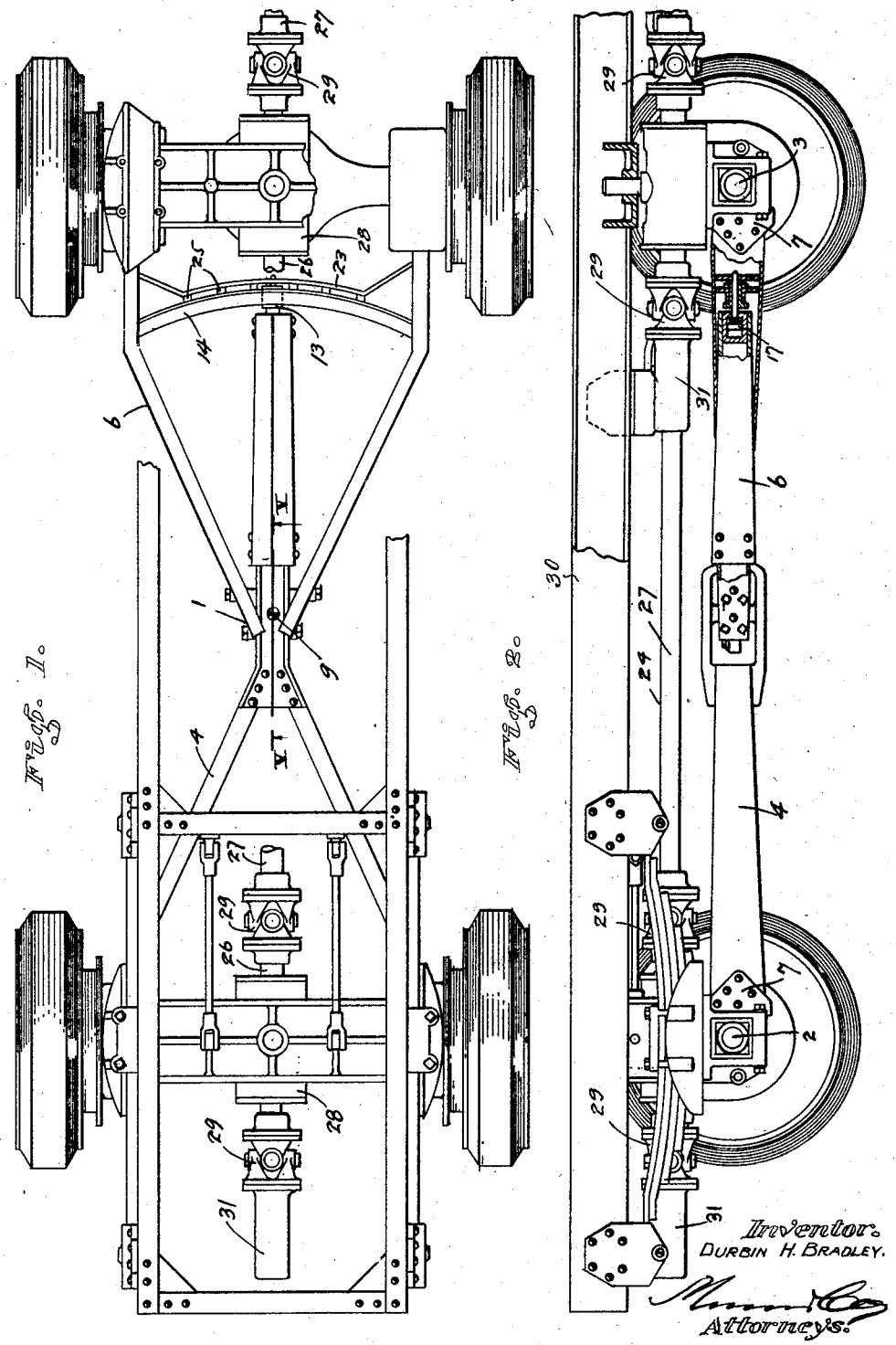

Patented Dec. 22, 1925.

1,566,726

UNITED STATES PATENT OFFICE.

DURBIN H. BRADLEY, OF SUNNYVALE, CALIFORNIA.

MOTOR VEHICLE.

Application filed December 28, 1921. Serial No. 525,313.

*To all whom it may concern:*

Be it known that I, DURBIN H. BRADLEY, a citizen of the United States, and resident of Sunnyvale, county of Santa Clara, and State of California, have invented a new and useful Motor Vehicle, of which the following is a specification.

The present invention relates to improvements in motor vehicles and has particular reference to means for steering and driving a plurality of vehicle axles directly, in such a manner that each axle is steered by the preceding axle so that its wheels substantially follow the track of the wheels of the preceding axle and that all the axles receive rotary motion directly from a longitudinal shaft extending throughout the axle train.

In this invention I utilize certain novel ideas disclosed in two co-pending applications, one being an application for Letters Patent on a coupling for axles, Serial No. 511,141, and the other one an application for Letters Patent on universal joint, Serial No. 525,312. The present invention is a combination of the ideas disclosed in those two applications together with other novel features which make their application to a train of vehicle axles possible.

By means of this combination a number of objects are obtained, the principal ones of which are the following:

The use of the coupling described in application Serial No. 511,141, allows of an arrangement of the axles in such a manner that all the vehicle wheels substantially follow the same track and the use of the universal joint allows of a direct connection between all of the axles so that by the use of proper gears all of the axles may be driven directly from one longitudinal shaft rotated by means of the power plant. Means are also provided allowing the power plant to be carried as a separate unit on its own spring and axle so that the power plant supporting means are in no way subjected to the strain caused by the load. Particular means are provided by which the rearmost axle can be set so as to assume a certain position relative to the preceding axle, which in combination with my coupling previously referred to will cause all the axles to trail the rearmost axle on a reverse motion. Other advantages will appear as the description proceeds.

With these objects in mind I have illustrated the preferred form of my invention in the accompanying drawings in which Figure 1 represents a top plan view of a vehicle train, only two axles being shown and certain portions being broken away, Figure 2 a side elevation of the device shown in Figure 1, Figure 3 a side elevation of a complete train of vehicles equipped with a power plant, Figure 4 a sectional detail view disclosing means for setting the rearmost axle in its position relative to the next preceding axle and Figure 5 an enlarged cross section along line 5—5 of Figure 1. While only the preferred form is shown in these illustrations it will be understood that various changes and modifications may be made within the scope of the claims hereto attached without departing from the spirit of the invention.

As stated before the coupling (1) used to connect each two axles (2) and (3) has been described in a copending application and it may suffice to briefly state that it comprises two frames (4) and (6) secured to their respective axles either rigidly as shown at (7, Figure 3) or pivotally as shown at (8) and extending toward each other so as to meet somewhere near the center between the two axles to be joined there pivotally, either by a vertical pin or preferably by means of a ball and socket joint (9) such as is shown in detail in Figure 5, in which the frame (6) carries the socket (11) while the frame (4) is operatively connected with the ball (12). It has been set forth in the application referred to, that by means of this construction the wheels of the rear axle will be caused to substantially trail in the tracks of the wheels of each front axle even though a large plurality of axles be used in one vehicle train. It will be readily seen from Figure 3 that the alternating rigid and pivotal connections (7) and (8) between the frames and the axles are used in order to allow each axle to rise or fall following the irregularities in the road without affecting neighboring axles, while the ball joints between the frames are provided to allow of freedom of play of each individual wheel.

A novel idea is introduced into this connection in the locking means for the rearmost axle. It will be remembered that all the axles are connected together in such a manner that each preceding axle steers or gives direction to the following axle. This connection works in both directions, that is, rearwardly as well as forwardly. The forward direction is of course controlled by means of the front axle as in any other motor vehicle. In order to enable the driver to steer the whole train of vehicle axles on a reversing motion as well as on a forward motion, I provide the locking means referred to which comprises a sliding member (13) engaging an arc-shaped member (14) associated with the frame (6). The rear end of the frame (4) carries a cylinder (16) in which a piston (17) is adapted to reciprocate acted on on one side by the spring (18) and on the other side by any suitable pressure that may be controlled from the driver's seat, such as compressed air admitted through the pipe (19). The piston has secured thereto a pin (21) which extends outside the cylinder and engages the slide (13). When pressure is applied through the pipe (19) the pin is forced through the slide (13) into engagement with one of a plurality of perforations (22), in an arc-shaped member (23) being symmetrical in shape to the member (14) and secured thereto by a plurality of spacing members (25). When the driver desires to reverse the train of vehicles in a desired direction, he only needs to manipulate the same until the rearmost axle occupies a position relative to the axle in front of the same adapted to guide the rear axle into the desired direction. The driver will then lock the rear axle in this position by the locking means previously described, whereupon he may proceed to move the train of vehicles backward irrespective of the relative positions of the other axles, since due to the operation of the couplings the wheels of each axle will trail the wheels of each preceding axle, irrespective of their starting position.

To impart rotary motion to the different axles I use a single longitudinal shaft (24) actuated from the power plant 25''' in the front portion of the vehicle the power plant being supported on the frame 25', the front end of which rests on the springs 25'' supported on the front axle while the rear end of the frame is hinged to the second axle as shown at 8. The shaft comprises a plurality of units which may be classed into driving units (26) and connecting units (27). The driving units (26) are carried in a housing (28) supported rigidly relative to the axle and are provided with suitable gears, such as worm gears or bevel gears for driving the axle. The connecting units (27) are secured between each two driving units (26) by means of the universal joints (29) described in my co-pending application, Serial No. 525,312, which are especially designed for this purpose and particularly effective due to the fact that they can be accurately adjusted so as to keep the shafts in perfect alinement, and due to the further fact that their design includes means for perfect lubrication. The connecting units are provided with suitable means allowing of longitudinal expansion and contraction as shown at (31) in Figure 3. The two rear axles 2 and 3 serve as support for the load carrying body 30.

I preferably separate the load supporting units of my vehicle train from the power plant supporting units so that the latter will not be subjected to any stress caused by the load. The power plant, as is indicated in Figure 3, is carried directly over the front axle while the frame holding the plant receives additional support from the second axle to which it is pivotally connected as shown at (8), and imparts direction to this latter axle when in motion.

I claim:

1. In a vehicle, the combination of a steering axle, a plurality of trailing axles, means for connecting the same so that all the axles follow substantially the same path and means for locking the rearmost axle in certain angular positions relative to the nearest axle, whereby all the axles are caused to substantially follow the path of the rearmost axle on a reversing motion.

2. In a vehicle, the combination of a steering axle, a plurality of trailing axles, means for connecting the same so that all the axles follow substantially the same path and means for locking the rearmost axle in certain angular positions relative to the nearest axle, whereby all the axles are caused to substantially follow the path of the rearmost axle on a reversing motion, said locking means being adapted to be actuated from the driver's seat.

3. In a vehicle the combination of a front or steering axle, a second axle, a frame supported by the first and second axles and pivoted to the second axle on a line running parallel to the latter axle, a third axle, a coupling connecting the second and third axles and arranged to cause the third axle to follow the track of the second axle when the vehicle is in motion, a power plant supported on the first frame above the front axle, means allowing the second and third axles to be driven from the power plant and a load carrying body supported on the two power driven axles, the coupling being independent of the load carrying body.

DURBIN H. BRADLEY.